United States Patent [19]

Seer, Jr.

[11] Patent Number: 4,510,564

[45] Date of Patent: Apr. 9, 1985

[54] SYNCHRONOUSLY DETECTED DC/DC CONVERTER FOR REGULATED POWER SUPPLY

[75] Inventor: Harold G. Seer, Jr., Woodbury, N.J.

[73] Assignee: RCA Corporation, New York, N.Y.

[21] Appl. No.: 513,400

[22] Filed: Jul. 14, 1983

[30] Foreign Application Priority Data

Mar. 24, 1983 [GB] United Kingdom ............... 8308100

[51] Int. Cl.³ .................................................. H02M 3/335
[52] U.S. Cl. ...................................... 363/23; 363/80; 323/267
[58] Field of Search .................................. 363/18–26, 363/78–80, 89, 97, 133–134; 323/267

[56] References Cited

U.S. PATENT DOCUMENTS 3,735,235   5/1973   Hamilton et al. ................ 363/26
4,208,706   6/1980   Suzuki et al. ..................... 363/26

Primary Examiner—Peter S. Wong
Attorney, Agent, or Firm—Paul J. Rasmussen; William H. Meise; Henry I. Steckler

[57] ABSTRACT

A regulated power supply has a synchronous detector in a voltage regulator feedback loop. The detector is coupled to a secondary of a transformer to detect the AC voltage. The result is faster response time to a step change in the primary voltage and all DC output voltages are constant.

6 Claims, 4 Drawing Figures

SYNCHRONOUSLY DETECTED DC/DC CONVERTER FOR REGULATED POWER SUPPLY

BACKGROUND OF THE INVENTION

The present invention relates to regulated power supplies, and more particularly, to ones with improved response time to a step change in input voltage.

FIG. 1 shows a typical prior art regulated supply. An unregulated DC voltage is received at input terminal 10 from power source 36 and applied to voltage regulator 12, which regulator 12 also receives an error voltage from comparator 14 (described below). Regulator 12 can be of the switching or linear type. A control voltage from regulator 12 is applied to a switching transistor DC to DC converter 16, which converter 16 can optionally receive a trigger signal at input 18. Converter 16 typically provides square waves having a frequency in the kilohertz range to primary winding 20 of transformer T1. Winding 22 is a feedback winding if converter 16 operates in the self-oscillating mode. Thus square waves appear at secondary windings 24, 26, 28 and 30 as shown when regulated by waveforms 301 and 302 in FIG. 3a, which waveforms are at points 1 and 2 of windings 24 and 26, respectively. The waveforms at points 3 and 4 are of opposite polarity to waveforms 302 and 301, respectively. The square waves are rectified, filtered, and then applied to a load. Three such sets of rectifiers and filters are shown: for secondary 24, diodes CR1 and CR2, capacitors C1 and C2, and inductor L1; for secondary 26, diodes CR3 and CR4, capacitors C3 and C4, and inductor L2; for secondary 32, diodes CR5 and CR6, capacitors C5 and C6, and inductor L3. Secondaries 28 and 30 would each also have such a set (not shown). Assuming that the DC output voltage at capacitor C2 is the most critical as regards voltage regulation, said voltage is applied to one input of comparator 14, and the other input receiving a reference voltage from source 34. The output voltage of comparator 14 is a function of the difference between said input voltages and comprises the error voltage mentioned above that is applied to regulator 12.

This circuit has at least two disadvantages. First, the voltage drop across diodes CR1 and CR2 increases as the current through them increases. Since the voltage across C2 is kept constant by the regulator, the other DC output voltages will increase with increasing load (lower load resistance) across C2. Second, the regulator response time to a step decrease occuring at time $T_1$ in FIG. 3 in the unregulated DC voltage at terminal 10 is relatively slow due to the relatively large values of C1, C2 and L1, and also depends on the current through L1, see portion TC of the unregulated waveform 303 shown in FIG. 3b, which waveform is the DC voltage across C2.

It is therefore desirable to provide a regulator circuit that has improved response time and keeps all output voltage constant.

SUMMARY OF THE INVENTION

A regulated power supply for operation from an unregulated DC power source, said supply comprising a reference voltage source; a comparator having a first input coupled to said reference source, a second input, and an output; a voltage regulator having a first input coupled to said comparator output, a second input adapted to be coupled to said power source, and an output; switching means having an input coupled to said voltage regulator output, and an output; a transformer having a primary winding coupled to said switching means output; and a secondary winding; coupling means for coupling to said secondary; and a synchronous detector having an control input coupled to said secondary, a signal input coupled to said coupling means, and an output coupled to said comparator second input.

DESCRIPTION OF THE DRAWINGS

FIGS. 3a and 3b show waveforms present in FIG. 1a, while FIG. 3c shows a waveform present in FIG. 2.

DETAILED-DESCRIPTION

Figure 1:
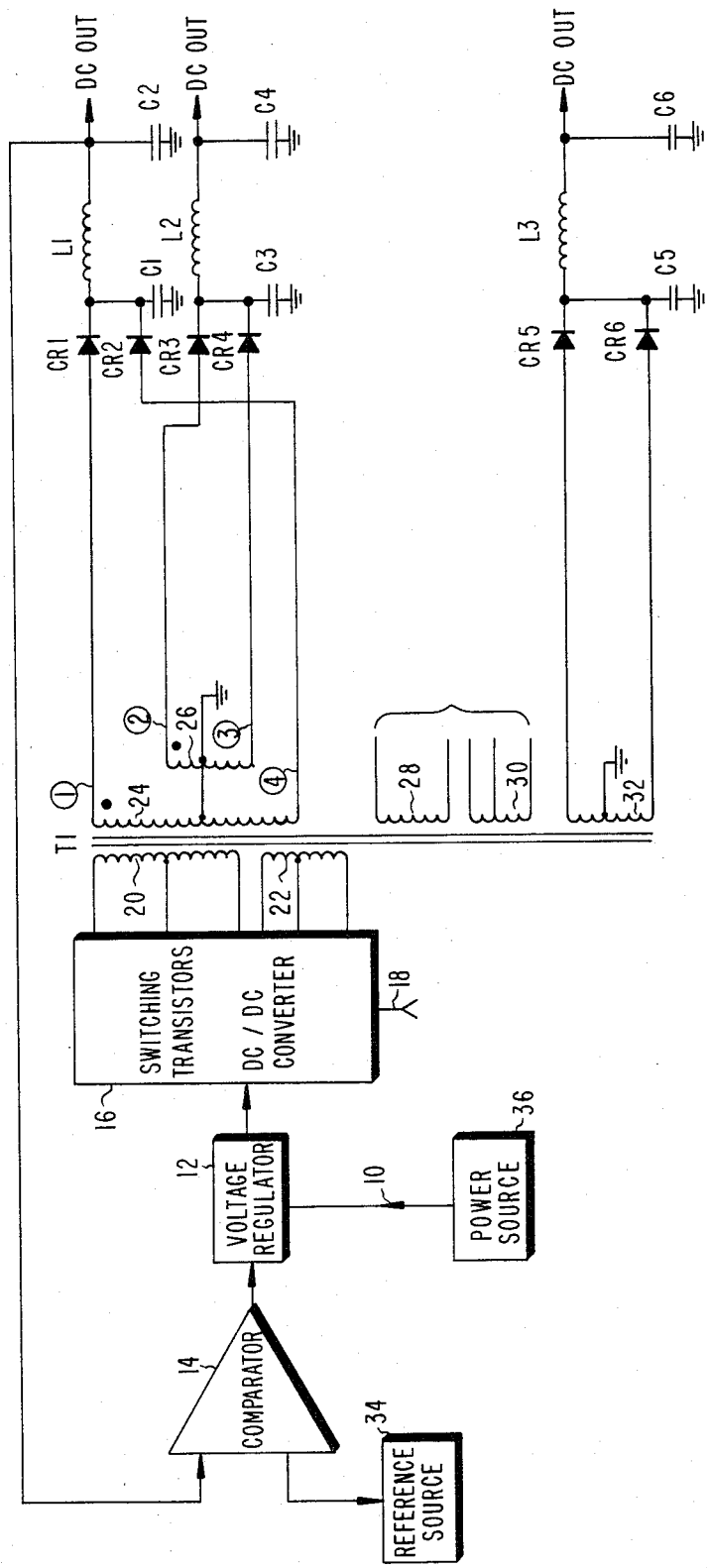
FIG. 1 is a circuit diagram of a typical prior art regulated DC/DC converter.
Figure 2:
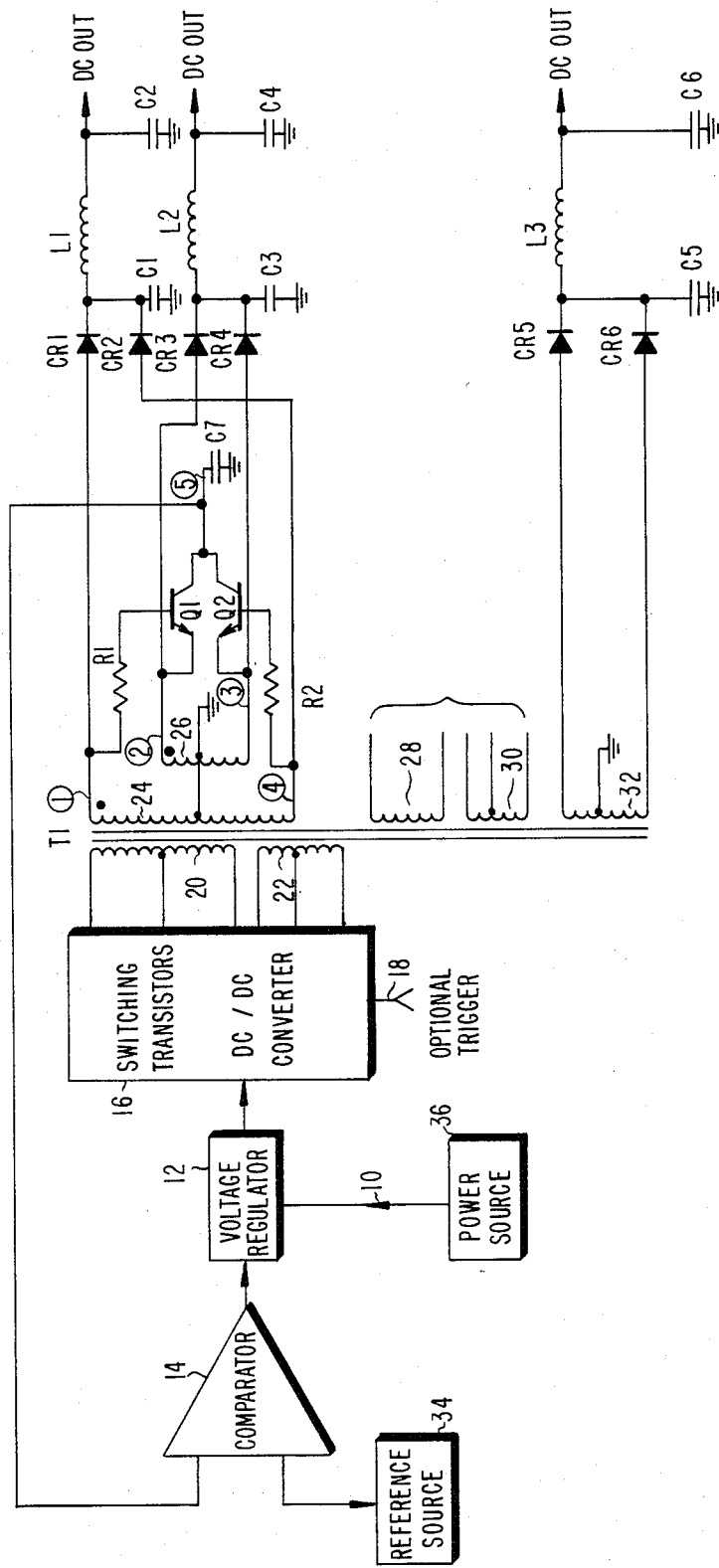
FIG. 2 is a circuit diagram of a regulated DC/DC converter in accordance with the invention, wherein corresponding reference numerals have been applied to corresponding elements.

In the circuit of the invention shown in FIG. 2, a synchronous detector comprising transistors Q1 and Q2 is present. The emitters of said transistors are respectively coupled to opposite sides of secondary winding 26 (points 2 and 3), while the bases thereof are respectively coupled through current limiting resistors R1 and R2 to points 1 and 4 of secondary 24. Since secondaries 24 and 26 are wound from a common physical center point, their center tap can be connected together to provide a common return path for the collectors of transistors Q1 and Q2. The return is through a ground (not shown) of comparator 14. Said collectors provide the synchronous detector output signal and are coupled together to capacitor C7, which capacitor can have a low value since it only removes "glitches" that occur when square wave signals are rectified by the synchronous detector. The DC detector output voltage, which is proportional to the AC voltage produced at winding 26, is applied to comparator 14.

Figure 3:
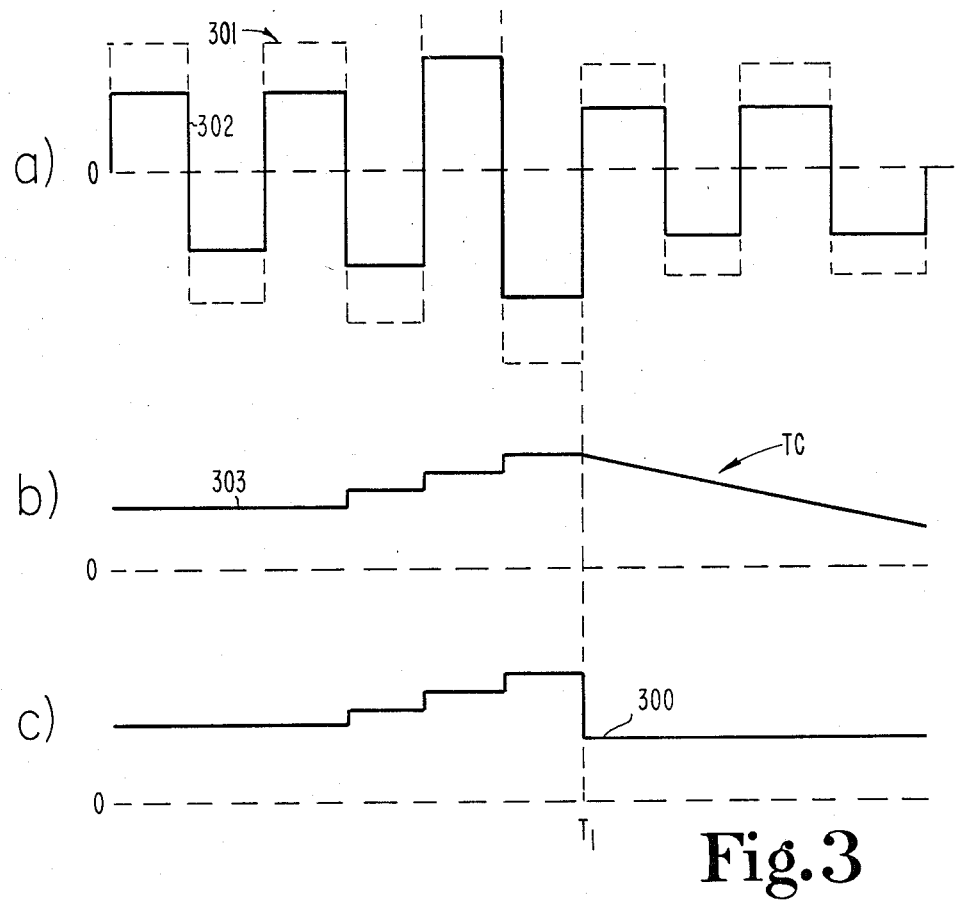

FIG. 3c shows the voltage at point 5 (detector output), when the regulation feedback loop is opened. It will be seen that portion 300 responds almost instantly to a down-step in the unregulated DC input voltage. This is due to the low value of capacitor C7 and low resistance of secondary 26. Further since no diodes are in the regulator feedback loop, the regulation is not adversely affected by changes in the current through, and hence the voltage across, any rectifying pair of diodes. Thus all DC output voltages are equally well regulated.

Figure 4:
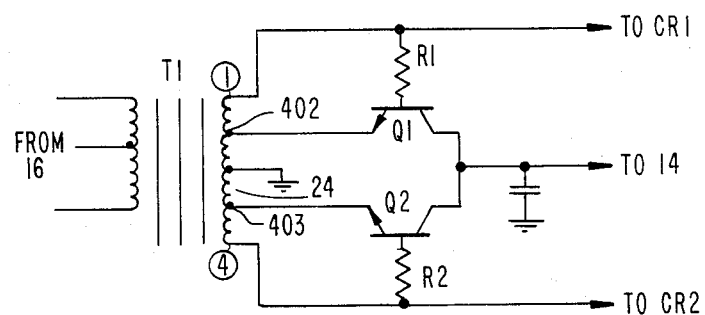
FIG. 4 shows a portion of an alternate embodiment.

FIG. 4 shows a portion of an alternate embodiment, wherein the portions not shown are identical to FIG. 2 and corresponding numerals are used for corresponding elements. In FIG. 4, winding 26 is not present; however winding 24 has taps 402 and 403, which taps are connected to the emitters of transistors Q1 and Q2. The taps must be positioned so that the voltage difference between point 1 and tap 402, as well as that between point 4 and tap 403 is sufficient to turn on transistors Q1 and Q2 respectively. The operation of FIG. 4 is the same as that of FIG. 2. If the resistance of winding 24 (FIG. 4) or winding 26 (FIG. 2) is not relatively low, a current change through these windings will produce changes in DC voltages derived from other secondary windings.

What is claimed is:

1. A regulated power supply for operation from an unregulated DC power source, said supply comprising a reference voltage source; a comparator having a first input coupled to said reference source, a second input, and an output; a voltage regulator having a first input coupled to said comparator output, a second input adapted to be coupled to said power source, and an output; switching means having an input coupled to said voltage regulator output, and an output; a transformer having a primary winding coupled to said switching means output, and a first secondary winding; coupling means for coupling to said secondary; and a synchronous detector having a control input coupled to said secondary, a signal input coupled to said coupling means, and a signal output coupled to said comparator second input.

2. A power supply as claimed in claim 1, further comprising a first rectifier and filter circuit coupled to said first secondary for producing a first DC output voltge.

3. A power supply as claimed in claim 1, wherein said transformer comprises a second secondary winding, and further comprising a second rectifier and filter circuit means coupled to said second secondary for producing a second DC output voltage; whereby regulating said first DC output voltage does not change said second DC output voltage.

4. A power supply as claimed in claim 1, wherein said coupling means comprises a second secondary winding having a common physical center point with said first secondary.

5. A power supply as claimed in claim 1, wherein said coupling means comprises a pair of taps on said first secondary.

6. A power supply as claimed in claim 1, wherein said synchronous detector comprises a pair of transistors, each having an emitter, collector, and base; said bases comprising said control input, said emitters and collectors respectively comprising said signal input and output; a pair of resistors respectively coupled between said secondary and said bases; and a capacitor coupled between said collector and ground.

* * * * *